(12) United States Patent
Staller et al.

(10) Patent No.: US 6,490,413 B2
(45) Date of Patent: Dec. 3, 2002

(54) COMPACT PHOTOGRAPHIC CAMERA

(75) Inventors: Norman D. Staller, Beverly, MA (US); Paul D. Gjeltema, Stow, MA (US); Patrick W. Hopkins, Amherst, NH (US); Michael G. Rider, Lowell, MA (US); Lawrence J. Salvo, Stow, MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/925,338

(22) Filed: Aug. 9, 2001

(65) Prior Publication Data

US 2002/0021893 A1 Feb. 21, 2002

Related U.S. Application Data

(60) Provisional application No. 60/223,958, filed on Aug. 9, 2000.

(51) Int. Cl.[7] .............................................. G03B 17/50
(52) U.S. Cl. ............................. 396/30; 396/36; 396/40
(58) Field of Search ............................ 396/30, 31, 32, 396/33, 34, 36, 40

(56) References Cited

U.S. PATENT DOCUMENTS

| | | | |
|---|---|---|---|
| 2,845,850 A | 8/1958 | Bing et al. | |
| 4,200,384 A | 4/1980 | Josephson et al. | |
| 4,299,471 A | 11/1981 | Alex et al. | |
| 5,237,361 A | 8/1993 | Cardoos, Jr. et al. | |
| 5,870,633 A | 2/1999 | Norris | 396/33 |
| 6,019,525 A | 2/2000 | Norris | 396/583 |
| 6,055,380 A | 4/2000 | Kurokawa | 397/176 |
| 6,099,172 A | 8/2000 | Togashi | 396/502 |
| 6,327,431 B1 * | 12/2001 | Parsons et al. | 396/31 |
| 6,397,007 B1 * | 5/2002 | Masubuchi et al. | 347/264 |

* cited by examiner

Primary Examiner—David M. Gray

(57) ABSTRACT

The present invention is a self-developing compact camera having a housing that encloses, in a common cavity thereof, an arrangement comprising a taking lens, shutter, a light-reflector, viewfinder, power source, actuator, a self-developing film compartment, and a spring biased exit flap. The present invention also includes a method of manufacturing said camera.

11 Claims, 6 Drawing Sheets

COMPACT PHOTOGRAPHIC CAMERA

CROSS-REFERENCE TO RELATED APPLICATION

The present application claims the benefit under 35 USC §120 of prior filed U.S. Provisional Patent Application Ser. No. 60/223,958, filed Aug. 09, 2000 and relates to copending U.S. patent application Ser. No. 09/501,077 filed Feb. 09, 2000.

BACKGROUND OF THE INVENTION

The present invention relates generally to photographic apparatus and, more specifically, to improvements regarding photographic apparatus for handling and processing film units of the self-developing type.

One commercially successful instant film system includes a camera wherein a self-developing film unit is removed manually from the camera following exposure, thereby effecting processing of the exposed unit, indexing of a subsequent film unit, and singulation of the pulled unit.

Examples of such cameras and film are described generally in commonly-assigned U.S. Pat. Nos. 5,870,633; 6,055,380; and, 6,099,172. Film assemblages that are particularly adapted for use in these cameras include an elongated strip containing in an alternating arrangement a plurality of successively aligned and identical film frames. Each of the film frames comprises generally coextensive positive and negative sheets that are generally rectangular in configuration and are in superimposed relationship to one another. In addition, a pair of elongated rails is provided that are sandwiched between the positive and negative sheets. Further included is a rupturable reservoir containing processing fluid at a leading end of the film unit and a trap at the trailing end of the unit. The reservoir includes a weakened portion that ruptures upon the application thereto of predetermined compressive forces that are applied by a pressure applying assembly during film assemblage removal. It is extremely important for the successful development of latent images that the fluid be spread in a relatively uniform layer. It is equally as important that ambient light not interfere or strike the unprocessed latent image before processing is complete as might occur by such light being lightpiped. Light-piping tends to occurs when ambient light travels along a portion of the film extending from the camera and strikes the still unprocessed exposed film in the interior of the camera. In addition, it is highly desirable to prevent against undesired light striking the film if components, such as the film loading door do not properly close.

It has been known to address the problem of non-uniform spreading of processing fluid between superposed sheets of photosensitive material, such as described in, for example, commonly assigned U.S. Pat. No. 2,845,850; and the above-noted crossreferenced patent application. It is also known to address the issues of light-piping. Many known approaches exist, such as is accomplished by a relatively large flap extending over an exterior portion of the camera's film exit slot; as is described in the last-noted patent application. In addition, there have been numerous efforts to insure that the camera is otherwise light tight particularly in those camera areas that are repeatedly opened and closed by the user, such as the film-loading door. Furthermore, despite the satisfactory results obtained using such past approaches there is, nevertheless, a desire to improve upon heretofore known approaches.

OBJECTS OF THE INVENTION

It is an object of the present invention to provide for an improved photographic apparatus and method of processing self-developing film that minimizes image artifacts caused by withdrawing the film from the exit slot at undesired pitch angles, and those caused by light-piping occurring during emergence of the film from the camera as the film is being pulled.

It is a further object of the present invention to provide for an improved photographic apparatus and method of the foregoing type wherein the film assemblage may be manually withdrawn from the slot without diminishing the uniform thickness of the processing fluid layer despite angular pitch changes of the film during withdrawal.

It is another object of the present invention to inhibit lightpiping with structure that covers the emerging film and at the same time includes film engagement members that selectively engage the film and limit the latter's degree of angular deviancy with respect to a desired horizontal film pulling plane so as not to alter uniform processing fluid thickness.

It is still a further object of the present invention to provide for an improved apparatus and method of foregoing type, which insures lighttight conditions of the camera including about the loading door.

It is still a further object of the present invention to provide for an improved apparatus and method of foregoing type, which is achieved in a simplified construction.

The above and other objects and scope of the present invention will become apparent following reading a detailed description thereof and taken in conjunction with the accompanying drawings in which like reference numerals designate like structure throughout the several views.

DETAILED DESCRIPTION

Figure 1:
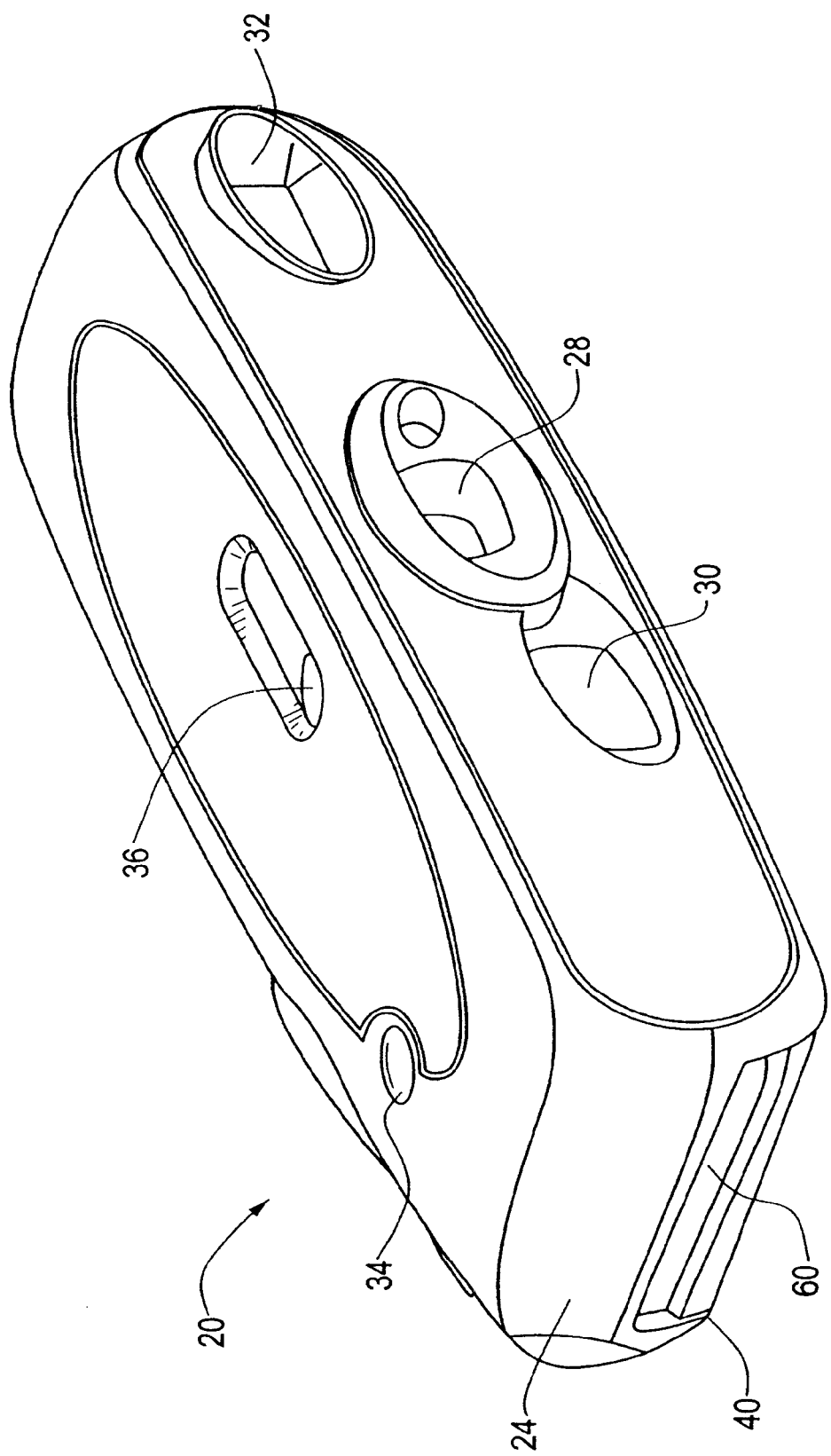
FIG. 1 is a perspective view of a camera for use in processing film of the self-developing type.
Figure 2:
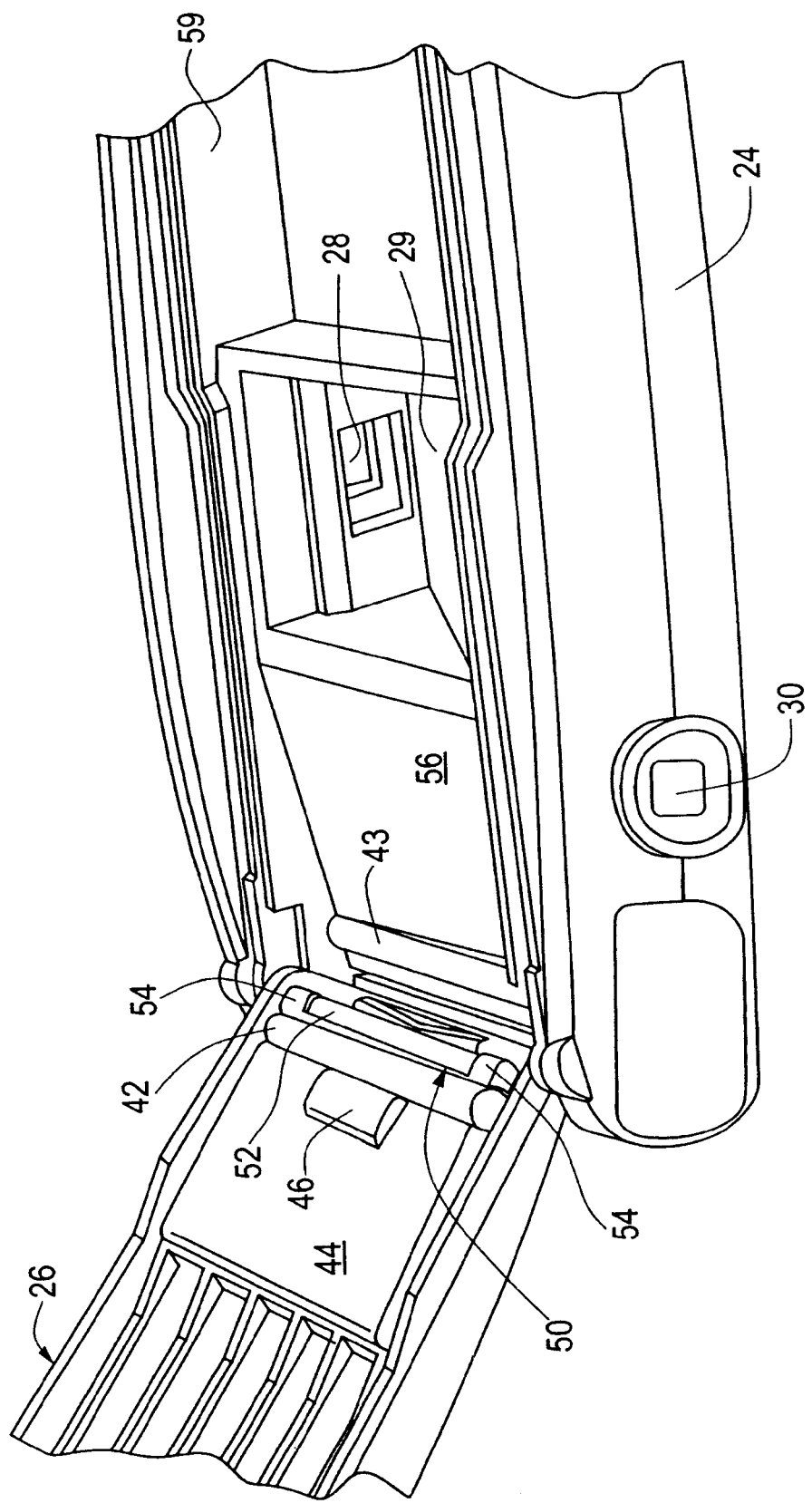
FIG. 2 is a partial perspective view of the interior of the camera when the latter is in an open condition.

Reference is initially made to FIGS. 1–6 for illustrating one preferred embodiment of a self-developing type photographic camera 20 employing a novel and improved film loading door and film flap to provide a compact, robust camera which minimizes image artifacts that might be caused by undesired film advancement or undesired ambient light striking unprocessed film.

The camera 20 has, preferably, a miniature or compact construction; such as described and illustrated in the above-noted patent application which description is incorporated herein and made a part hereof. The camera 20 is adapted for manual operation for initiating processing of a film assemblage 22. The film assemblage 22 does not, per se, form an aspect of the present invention. Accordingly, only those portions of the film that are necessary to understand the present invention will be presented. The film assemblage 22 is, however, more completely described and illustrated in copending and commonly assigned applications, Ser. Nos. 08/958, 902; and, 08/959,361; which applications are incorporated herein and made a part hereof. The camera 20 includes a main housing 24, a camera frame 25, a film loading door 26, a taking lens assembly 28, a mirror 29, an optical viewfinder 30, a strobe 32, a shutter button 34, and an aperture selector switch 36.

Figure 3:
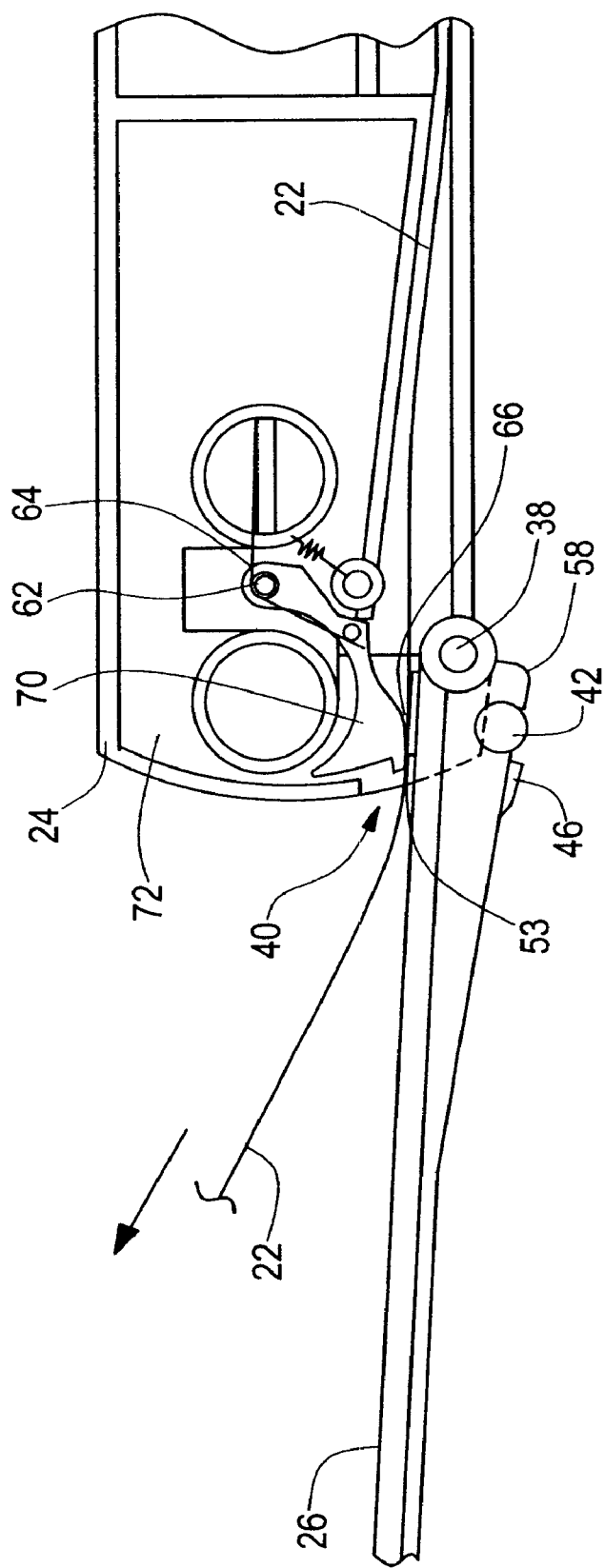
FIG. 3 is a partial elevation view of the camera in the open condition which illustrates the cooperation of the improved loading door assembly and film flap of the present invention.
Figure 4:
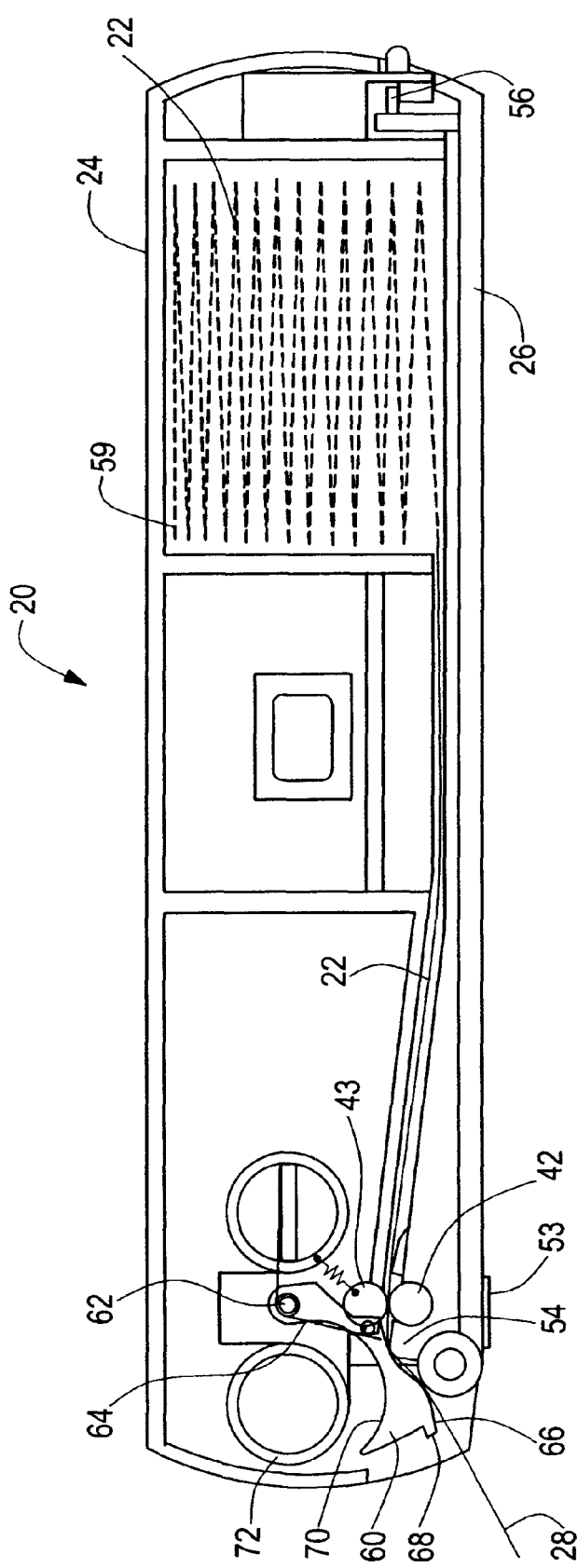
FIG. 4 is a schematic cross sectional view illustrating cooperation of the film flap and film in one mode of operation.
Figure 5:
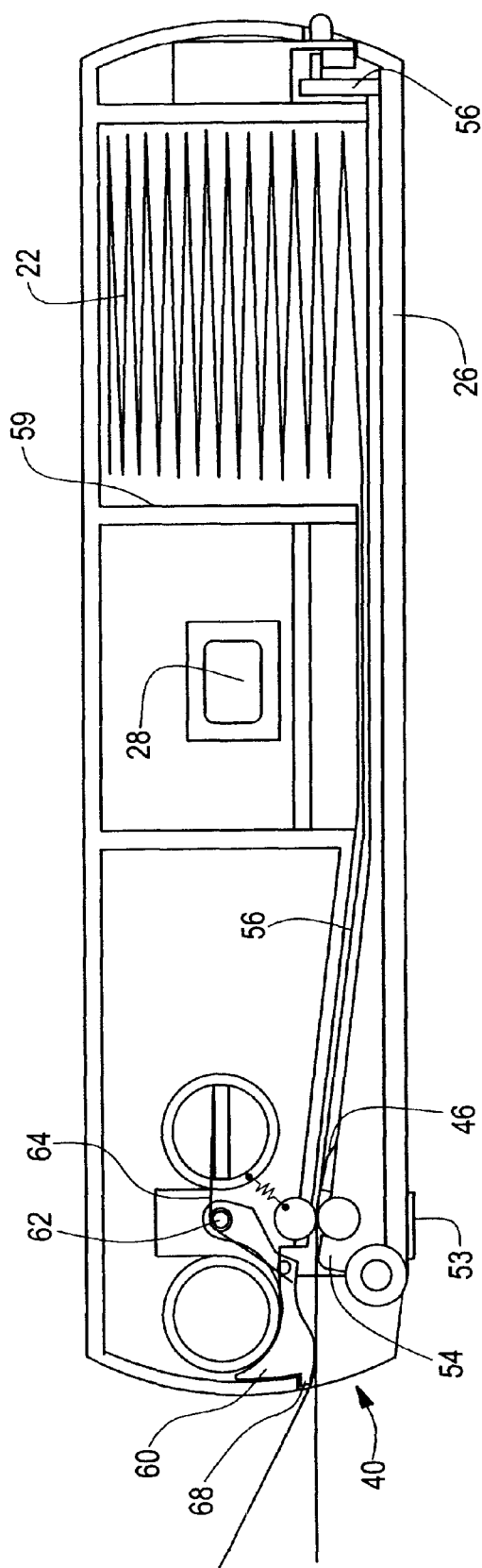
FIG. 5 is a schematic similar to FIG. 4 but illustrating the camera in another mode of operation.
Figure 6:
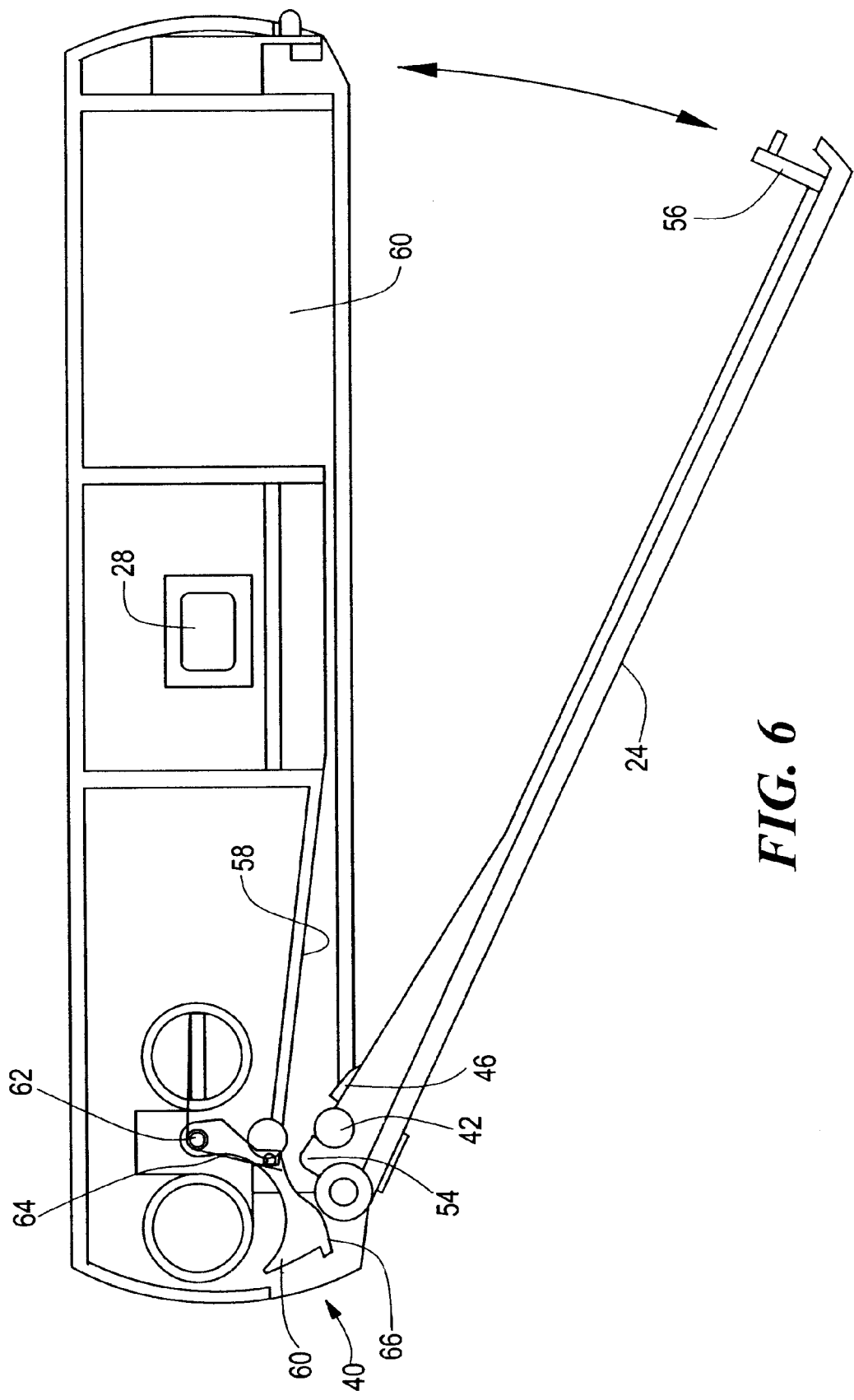
FIG. 6 is a schematic elevation view similar to FIG. 5, but illustrating the camera loading door in a partially open condition.

The film loading door 26 is pivotally connected at 38 to the camera frame 25 so as to be located adjacent a film exit opening 40. A lower spread roller 42 is, preferably, rotatably mounted on an interior portion of the door 26 adjacent one end thereof. A spring biased upper spread roller 43 is rotatably mounted in the main housing 24. In this embodiment the spread rollers 42, 43 when the door is closed provide a zero gap for the film 22 that extends therethrough as well as prevents light from entering the film chamber. The spread rollers 42, 43 provide the pressure to rupture the pod in the film units as well as spread the fluid to initiate spreading. According to the present invention, there is provided a unitary molded plastic pre-spread assembly 44 that is mounted on the door 26 in such a manner that the bowshim or pre-spread surface 46 protrudes upwardly from an otherwise planar configuration of the door. It is contemplated that other insert assemblies can replace the present one in order to be used with different film assemblages. The prespread surface 46 is adjacent the lower spread roller, as illustrated, and its configured and sized to provide the uniform spreading of the processing fluid after the latter flows from the ruptured pod as the film enters the nip of the spread rollers. The door 26 is provided with a lower set 50 of anti-skiving structure that is similar in construction to the last noted patent application. This structure does not, per se, form an aspect of the present invention. It will be noted, however, that there is provided a longitudinally recessed transverse member 52 that bridges a pair film engaging members 54 to prevent buckling of the film as the latter is pulled downwardly from a desired generally horizontal pulling plane (not shown) so that the film engages the film engaging members. The transverse member 52 is recessed or undercut below the film engaging surfaces of the film engaging members 54 by an amount that is approximately equal to the thickness of the processing fluid. The film engaging members and transverse members are rounded and smooth to minimize the likelihood of any adverse pressure being applied to the film. According to the present invention, provision is made for having the film engaging surfaces extend ahead of the bite line by a sufficient distance that allows accommodate lateral attachment points of each frame skirt (not shown) on the film assemblage, whereby the latter do not prematurely separate. The door 26 is provided with a pair of generally parallel and laterally spaced apart ribs or pads 53 which serve to upwardly displace the film flap to allow feeding of the film through the space between the film door 26 and film flap door 60; as shown in FIG. 3.

Referring back to the pair of spread rollers 42, 43 they are mounted to one side of the door 26 adjacent the pivot along with the lower anti-skiving structure 50. It will be appreciated that by positioning the rollers at the pivot end as opposed to the distal end of the door as was done in earlier versions of this type of camera, provision can be made for a single latch 56 that securely latches to a corresponding catch in the main frame, thereby releasably holding the door in its closed condition. This provides a robust closing feature that facilitates effecting a closed condition for the film and hence prevents ambient light from entering the camera and fogging the film when the latter is loaded. It will be noted that prior to the upper spread roller 43, provision is made for a ramped film path surface 58 which guides the film to the spread rollers and effectively serves to reduce the axial extent of film travel within the camera. A film storage compartment 59 is adapted to hold a package (not shown) of the film assemblage 22.

Continued reference is made to an upper anti-skiving structure which in the preferred embodiment is represented by a film flap door 60 that extends transversely to cover the opening 40. The film flap 60 is pivotally mounted as at 62 to the frame and is biased by a torsion spring 64 to the closed condition for closing the opening 40. Because the flap is biased, a generally smooth and arcuate bottom surface 66 thereof can follow and rest against the film. The smooth surface 66 is adapted to provide for anti-skiving features in the same manner as the upper set of anti-skiving features as described in the last-noted patent application. It will be noted that the film flap 60 includes a concave surface 70 that is adapted to engage a bottom surface of a battery compartment 72 to limit upward movement of the flap. Significantly, however, the bottom surface 66 engages the film and serves to prevent ambient light from passing beyond this contact point to that portion of the film emerging from the nip or bite of the rollers. Hence, not only does the flap also reduce skiving from producing image artifacts when the film is pulled upwardly as viewed in FIG. 5 and downwardly as viewed in FIG. 4, but limits light-piping from producing image artifacts.

It will be noted that the film engaging members serve to limit the angular deflection of the film being pulled relative to a horizontal plane, as viewed in the drawings, that includes the bite line of the pressure applying rollers. This limits the angular deflection or deviancy of film withdrawal when the film is pulled at an angle from the film exit slot. The film engaging members can be longer or shorter than film engaging members, but their lengths should allow the processing fluid enough time to harden during pulling so as to avoid separations of the fluid from one of the two sheets. Such separations which would therefore hinder dye transfer. The pairs of film engaging members as illustrated allows an operator a downward angular pitch of about 40° from the pulling plane including the bite line; and an upward angular pitch of about 30° relative to the pulling plane 44.

Various modifications and adaptations of the present invention will become readily apparent to those of ordinary skill in the art but without departing from the scope of the invention.

What is claimed is:

1. A self-developing compact camera having a housing that encloses, in a common cavity thereof, an arrangement comprising a taking lens, shutter, a light-reflector, viewfinder, power source, actuator, a self-developing film compartment, and a spring biased exit flap, the arrangement being such that: (a) said exit flap is shaped such to substantially prevent skiving of said film when pulling said film at excessive upward angles out from said housing; (b) said exit flap substantially prevents light piping of said film during said films withdrawal from said camera; and (c) said exit flap also substantially prevents entry of light in-between two exit spread rollers when said film is at rest.

2. The compact camera of claim 1 wherein said exit flap is pivotably mounted and spring biased such that it substantially covers a film exit opening in said housing in a first resting position when said film is at rest, and said exit flap rotates upward, about a pivot point, to partially and/or fully uncover said film exit opening while said film is withdrawn from said film exit opening.

3. The compact camera of claim 1 wherein said exit flap has an arcuate shaped bottom surface.

4. The compact camera of claim 1 further comprising a film path surface being angled upward away from a film loading door of said housing.

5. A self-developing compact camera having a housing that encloses, in a common cavity thereof, an arrangement comprising a taking lens, shutter, a light-reflector, viewfinder, power source, actuator, a self-developing film compartment, a spring biased exit flap, and a film loading door, the arrangement being such that: (a) said film loading door having a latch means at a first end, and said film loading door having a pivot and spread plate substantially located at a second end of said film loading door.

6. The compact camera of claim 5 wherein said film compartment is located inside said camera housing near said first end of said film loading door.

7. The compact camera of claim 5 wherein said second end of said film loading door is pivotally attached to a second end of said camera housing, said second end of said camera housing also comprising a film exit means.

8. The compact camera of claim 5 wherein said spread plate is angularly disposed with said film loading door to guide self-developing film toward a film exit means.

9. The compact camera of claim 5 further including a cam member and/or cam members disposed with an outward and bottom surface, at said second end, of said film loading door, wherein said cam rotates said exit flap and thereby facilitating loading of self-developing film along said film loading door and out a film exit means.

10. The compact camera of claim 5 wherein said latch means comprises a single latch comprising a pivoted bar that releasably engages with a notch.

11. A method of manufacturing a self-developing compact camera, said method comprising the steps of:

a) providing a housing that encloses, in a common cavity thereof, an arrangement comprising a taking lens, shutter, a light-reflector, viewfinder, power source, actuator, and a self-developing film compartment;

b) providing a spring biased exit flap; and c) arranging the aforetohere mentioned components such that:

(i) said exit flap is shaped such to substantially prevent skiving of self-developing film when pulling said film at excessive upward angles away from said housing;

(ii) said exit flap substantially prevents light piping of said film during said films withdrawal from said camera; and (iii) said exit flap substantially prevents entry of ambient light in-between two exit spread rollers.

* * * * *